(12) United States Patent
Dussardier et al.

(10) Patent No.: US 12,296,505 B2
(45) Date of Patent: May 13, 2025

(54) ROTOR WITH ANTI-WEAR DEVICE AND FIXATION SYSTEM

(71) Applicant: COMPAGNIE GENERALE DES ETABLISSEMENTS MICHELIN, Clermont-Ferrand (FR)

(72) Inventors: Bruno Dussardier, Clermont-Ferrand (FR); Cedric Carlavan, Clermont-Ferrand (FR); Yves Liais, Clermont-Ferrand (FR); Crescence Weber, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 646 days.

(21) Appl. No.: 17/631,697

(22) PCT Filed: Jul. 7, 2020

(86) PCT No.: PCT/EP2020/069058
§ 371 (c)(1),
(2) Date: Jan. 31, 2022

(87) PCT Pub. No.: WO2021/018521
PCT Pub. Date: Feb. 4, 2021

(65) Prior Publication Data
US 2022/0266475 A1    Aug. 25, 2022

(30) Foreign Application Priority Data
Aug. 1, 2019    (FR) ........................ 1908853

(51) Int. Cl.
*B29B 7/18*    (2006.01)
*B29B 7/74*    (2006.01)
*B29B 7/22*    (2006.01)

(52) U.S. Cl.
CPC ............ *B29B 7/186* (2013.01); *B29B 7/7495* (2013.01); *B29B 7/22* (2013.01); *B29B 7/7461* (2013.01)

(58) Field of Classification Search
CPC ......... B30B 9/121; B29B 7/186; B29B 7/489; B29C 48/25682; B29C 48/57
See application file for complete search history.

(56) References Cited

U.S. PATENT DOCUMENTS 3,275,334 A  *  9/1966  Voitik ...................... F16J 15/32
                                                                    277/374
3,592,128 A  *  7/1971  French ..................... B30B 9/121
                                                                    100/150
(Continued)

FOREIGN PATENT DOCUMENTS

CN    201389929 Y    1/2010
CN    202528336 U    11/2012
(Continued)

OTHER PUBLICATIONS

International Search Report dated Sep. 7, 2020, in corresponding PCT/EP2020/069058 (3 pages).

*Primary Examiner* — Elizabeth Insler
(74) *Attorney, Agent, or Firm* — VENABLE LLP

(57) ABSTRACT

In the field of mixing rubber mixtures, a rotor (100), for use in an internal mixer having a mixing vessel in which the rotor rotates, includes one or more blades (104), each blade having a tip (104a) with a profile having a predefined curvature and an anti-wear device detachably fixed to the tip (104a) of at least one blade. The anti-wear device includes a plate (110) with a profile defined by a lower surface (112) with a curvature complementary to that of the tip (104a) and an upper surface (114) with a curvature complementary to that of a wall of the vessel to define, between them, a zone of minimum distance that allows a passage of the mixture (Continued)

between the plate (110) and the wall of the vessel. One or more fastening systems (135) are fitted and tightened with respect to the plate (110) so as to engage the rotor (100).

13 Claims, 7 Drawing Sheets

(56) References Cited

U.S. PATENT DOCUMENTS

| | | | |
|---|---|---|---|
| 3,612,169 A | * | 10/1971 | Matsuoka ............... B29B 7/186 |
| | | | 165/DIG. 147 |
| 4,917,501 A | | 4/1990 | Simonet et al. |
| 5,368,383 A | | 11/1994 | Peter et al. |
| 11,478,955 B2 | | 10/2022 | Dussardier et al. |

FOREIGN PATENT DOCUMENTS

| | | |
|---|---|---|
| CN | 204525822 U | 8/2015 |
| DE | 3943344 C1 | 10/1990 |
| FR | 2632873 A1 | 12/1989 |
| JP | 2012-153114 A | 8/2012 |
| WO | 2019/224466 A1 | 11/2019 |

\* cited by examiner

ROTOR WITH ANTI-WEAR DEVICE AND FIXATION SYSTEM

TECHNICAL DOMAIN

The invention relates generally to the production of rubber mixtures and vehicle tires prepared therefrom. More particularly, the invention concerns an anti-wear device for a rotor used in a mixer for a rubber mixture.

BACKGROUND

In the field of elastomer production, internal mixers are used for mixing raw materials. By "internal mixer" (or "mixer" or "MI") is meant a machine including a metal ram and two metal half-vessels (or "vessels"), each containing a metal rotor with one or more blades (e.g., a Banbury or Intermix type machine for polymers). When the materials in a mixture are mixed, an elastomer in the process of being manufactured is subjected to significant stress. Referring to FIG. 1, this phenomenon is explained with reference to a rotor 10 that is arranged in a vessel 20 and that rotates in the direction of arrow A, the rotor 10 being part of a pair of rotors arranged in parallel so that they can rotate in mutually opposite directions. The rotor 10 has blades 12, and each blade has a tip 12a. As the tip 12a rotates, it will delineate a circular path 12b as shown in FIG. 1. A gap $E_{12}$ is defined between the wall 20a of a vessel 20 and the circular path 12b. The raw materials of the rubber mixture, which enter the vessel 20 through an inlet 22, pass through the gap $E_{12}$ between the rotor blades and the wall of each vessel. The raw materials pass the tip 12a where high shear forces are realized that will generate the worn areas.

This phenomenon is present on rotors of the "monobloc" type in an internal mixer where it is observed that the worn areas are always located at the same place of the rotor blades. Referring to FIG. 2, a representative rotor of a monobloc type is represented by a rotor 30 that is arranged in a vessel 50 (the rotor 30 being disclosed by patent FR2632873). The rotor 30 has an axial shaft 32 with an axis of rotation around which the rotor is rotated in the direction of arrow B. The axial shaft 32 has a circumferential surface 32a from which one or more blades 34 extend radially. In a plane perpendicular to the axis of rotation of the rotor 30, a curvature of the profile of the blade 34 is defined by a center of curvature C and a radius of curvature R. This curvature corresponds to a curvature of the wall of the vessel 50. An edge 34a of the blade 34 defines, together with the vessel wall 50, a gap $E_{30}$ along which the materials of the rubber mixture pass (as described in relation to the gap $E_{12}$ in FIG. 1).

An area of very short length exists along the gap $E_{30}$ where the level of work carried out is very intensive. With the current rubber formulations, which are evolving towards increasingly higher rates of reinforcing fillers (e.g., higher levels of carbon black and silica), the elastomers produced are highly abrasive to the metal surfaces of the internal mixers. At the same time, mixing cycles are optimized to ensure maximum productivity.

Wear is not uniform: the rotor itself is eroded, and some more prominent parts of the rotor, such as the blades, are even more eroded. This results in the development of undesirable clearances between the blades and the wall that have a negative impact on the productivity and quality of the rubber mixture. The consequence of these developments is a problem of premature wear that is found on mixer rotors. The observed wear can be up to several millimeters, while the remaining metal surfaces of the mixer do not suffer the same level of wear. The service life of some mechanical parts such as rotors is reduced by up to 50%. The downtime for changing these rotors (assembly and disassembly) is long and costly and requires the complete shutdown of the mixer. The production of semi-finished elastomers cannot be carried out as planned.

Among the recognized solutions to limit this phenomenon, there is the device disclosed by the publication CN201389929. This device involves one or more anti-wear devices attached to the circumferential surface of a vessel and/or along a surface of a rotor blade machined from a single piece. However, each known rotor is characterized by the profile of the blades (i.e., a flat section, taken perpendicular to the axis of rotation of the rotor, which defines the profile of the blades as shown in FIG. 1) and by the positioning of the blades on a surface of the rotor. This solution describes only the direct placement of wear protection devices on a rotor machined from a single piece without explaining the potential impacts on its geometry and the corresponding rubber mixing performance.

In addition, the addition of an anti-wear device decreases the cooling efficiency. However, it is particularly important to be able to cool the blade tip, as the temperature increase here is higher than in other areas of the rotor. For this reason, rotors are often equipped with cooling systems in the form of geometrical channels drilled into the interior of the rotor to control the temperature of the mixture during the mixing cycle, this temperature being able to reach about 150° C. to 170° C.

In order to preserve the rubber dispersion, the rubber mixing performance and the quality of the rubber mixture, the invention therefore concerns the installation of a removable anti-wear device on the rotor blades in the areas where wear occurs. The anti-wear device includes a plate that is detachably fixed to a rotor adapted to realize its fixation. When attached to the rotor, the plate provides a means for easy replacement of a worn rotor part without changing the rotor geometry. The rotor therefore includes two parts, including an easily replaceable part, that function as a one-piece rotor at a lower cost.

SUMMARY OF THE INVENTION

The invention relates to a rotor for use in an internal mixer having a mixing vessel in which the rotor rotates, the rotor including:

one or more blades, each blade having a tip with a profile having a predefined curvature;

an anti-wear device detachably fixed to the tip of at least one blade, the anti-wear device having a plate with a profile defined by a front surface with a curvature complementary to that of the tip and an upper surface with a curvature complementary to that of a wall of the vessel to define therebetween a region of minimum clearance that permits passage of a mixture between the plate and the wall of the vessel; and one or more fasteners fitted and tightened to the plate to engage the rotor.

In certain embodiments, the profile of the plate is defined by a radius of curvature of the plate that is increasingly progressive in a clockwise direction so that the profile of the plate resembles a spiral.

In certain embodiments, the plate includes one or more cooling channels that extend axially along a length of the plate, the cooling channels being arranged along the profile of the plate and connecting to supply conduits that convey a coolant corresponding to the plate from a main conduit of the rotor.

In certain embodiments, the rotor further includes a sealing means. In some such embodiments, the sealing means is an O-ring that is placed in a corresponding groove. In certain embodiments, the groove is a trapezoidal groove.

In certain embodiments, each fastening system includes:
a retaining screw including:
an elongated substantially cylindrical screw head with a circumferential surface corresponding to the diameter of a counterbore of the plate into which the retaining screw is inserted, the screw head extending along a predetermined length between an engagement end, where an engagement surface is defined for engaging a shoulder of the counterbore of the plate, and an access end, the screw head with an insertion channel extending along the length of the screw head with a predetermined cross-sectional geometry;
a substantially cylindrical elongated screw body extending from the engagement surface of the screw head, the screw body with a predetermined diameter being held in a thread of the corresponding rotor in which the holding screw is mounted, the screw body extending along a predetermined length between an insertion end, where the screw body receives a clamping means passing to the insertion conduit of the screw head, and an opposite end fixed in the rotor, the screw body with a mounting conduit extending along the length of the screw body;
and a clamping means having a central pin, the central pin including:
a plug with a cross-sectional geometry corresponding to the predetermined cross-sectional geometry of the screw head insertion channel, the plug extending along a predetermined length between an engaging end, wherein an engaging surface of the plug is defined to engage against a shoulder of the screw head insertion channel, and an opposite outer end; and
a substantially cylindrical elongated rod extending from the engagement end of the plug, the rod having a predetermined diameter corresponding to the screw body mounting channel for mounting the central pin therein.

In certain embodiments, each counterbore of the plate is aligned with a corresponding rotor thread so that a corresponding retaining screw can penetrate the counterbore of the plate aligned with the rotor thread where the retaining screw is positioned relative to the rotor.

In certain embodiments, the fastening system further includes a cam locking washer, the cam locking washer being disposed between the engagement end of the screw head and the shoulder of the counterbore of the plate.

In certain embodiments, the rotor also includes a mechanical fastening system. In some such embodiments, the mechanical locking system includes a positioning key. In some such embodiments, the positioning key includes a parallel key with an upper surface that engages a corresponding reinforcement of the front surface of the plate, the positioning key engaging a corresponding groove at the top.

In certain embodiments, the rotor includes two blades, and the blades are inclined in mutually opposite directions.

The invention also relates to an internal mixer having at least one mixing vessel in which a rotor of the invention rotates.

Other aspects of the invention will become evident from the following detailed description.

BRIEF DESCRIPTION OF THE DRAWINGS

The nature and the various advantages of the invention will become more evident upon reading the following detailed description, together with the attached drawings, in which the same reference numbers designate identical parts everywhere, and in which.

DETAILED DESCRIPTION

Figure 1:
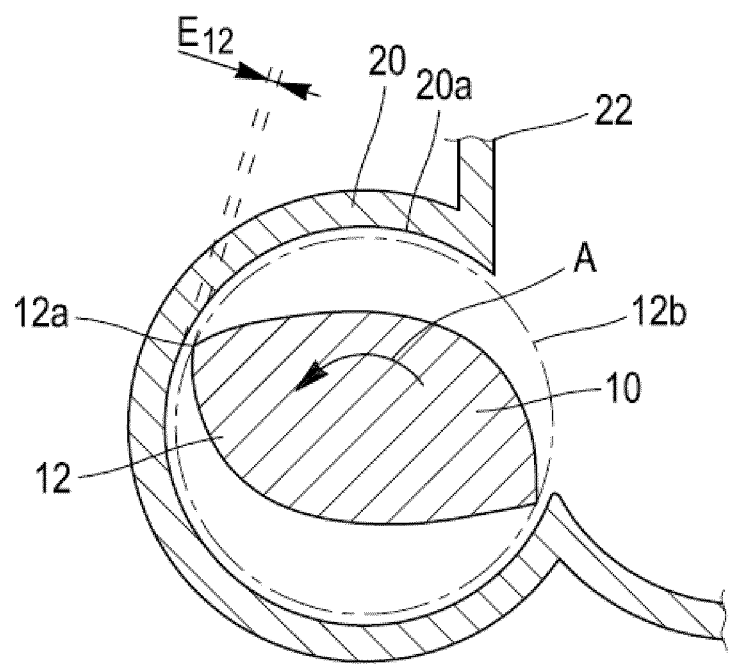
FIG. 1 represents a planar section, taken perpendicularly to the axis of rotation of the rotor of a known internal mixer.
Figure 2:
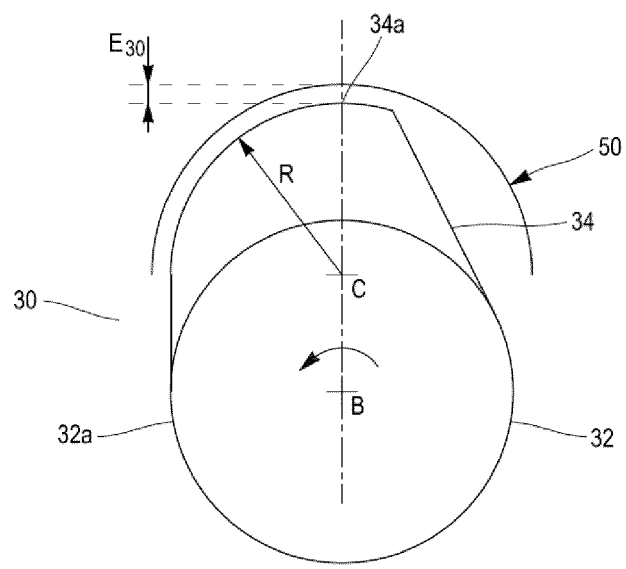
FIG. 2 represents a view of a profile of a one-piece rotor of the prior art.
Figure 3:
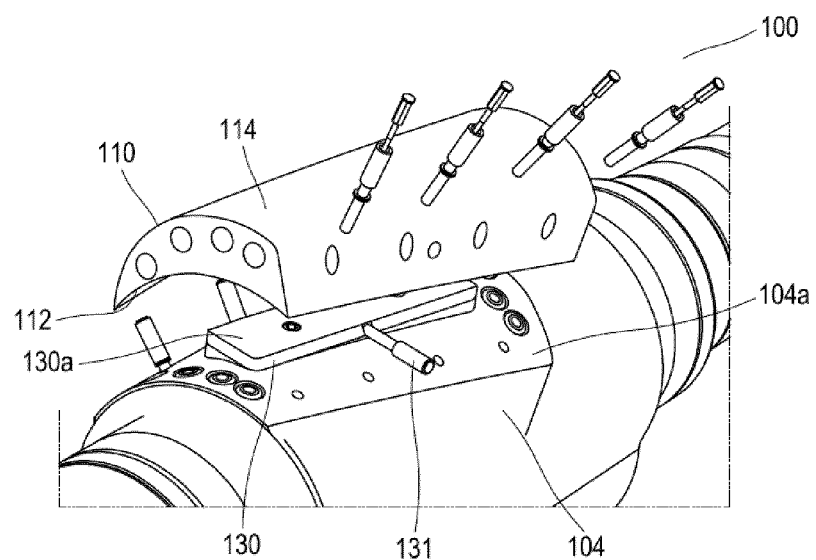
FIG. 3 represents an exploded partial view of a rotor and an anti-wear device of the invention.

Referring now to the figures, in which the same numbers identify identical components, FIG. 3 shows a rotor 100 supplied with an anti-wear device to increase the service life of the rotor and to increase its ability to resist abrasion by a rubber mixture. The rotor 100 is shown as a one-piece rotor as described above, having one or more blades 104. It is understood that the rotor may be selected from a configuration known in the art (for example, the rotor may be a tangential rotor, a meshing rotor or an equivalent rotor). The rotor 100 is made of a metallic material such as steel (normal steel or high-strength steel). It is understood that another metal or equivalent material may be used (e.g., stainless steel, titanium, etc.). A known chemical protective coating can be added to any part of the rotor 100.

The placement and attachment of the anti-wear device is made with reference to a tip 104a of the blade 104. The rotor 100 is machined to create a tip 104a of the blade 104 that allows the connection of a plate 110. In a plane perpendicular to the axis of rotation of the rotor 100, a curvature of a profile of the tip 104a is defined by a rotor center of curvature and a rotor radius of curvature.

Figure 4:
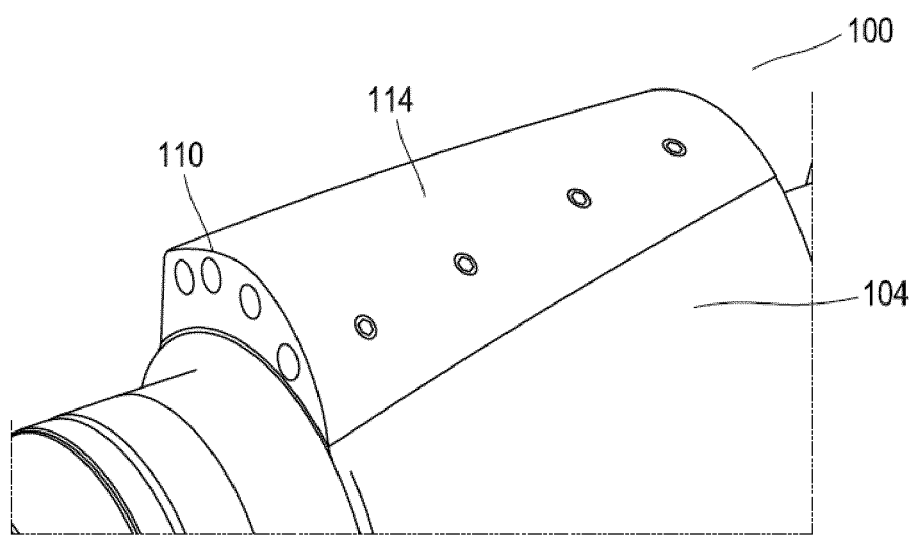
FIG. 4 represents a perspective view of a representative rotor with which the anti-wear device of FIG. 3 is used.
Figure 7:
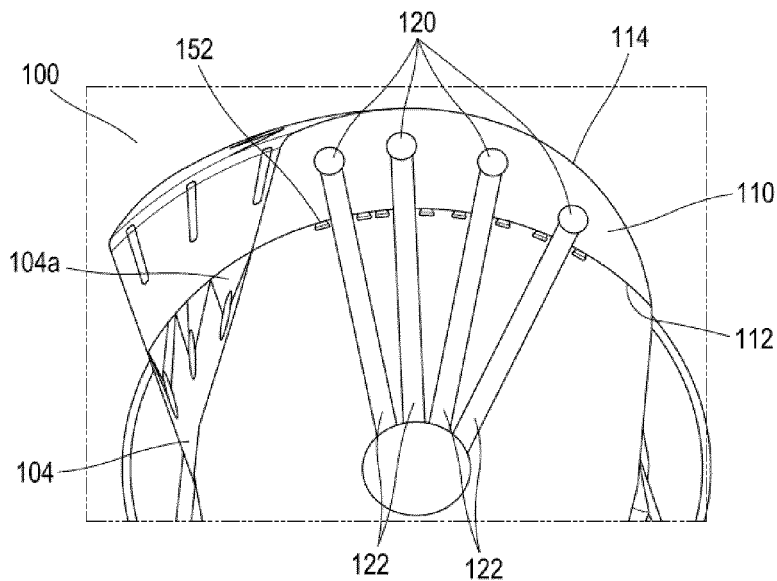
FIG. 7 represents a partial cross-sectional view, of the rotor and the anti-wear device of the invention.
Figure 8:
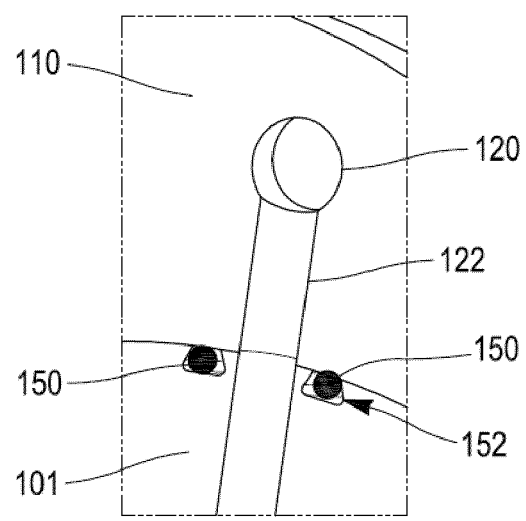
FIG. 8 represents a partial cross-sectional view of an embodiment of the invention that uses a sealing means between the rotor and the anti-wear device.
Figure 9:
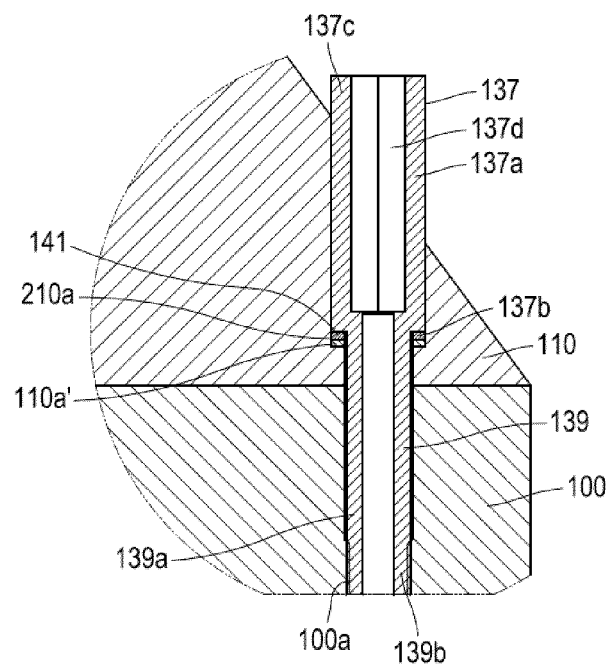
FIGS. 9 to 11 represent partial cross-sectional views of the rotor and the anti-wear device fastened with a screw fastening system, with the fastening system being installed with the rotor.
Figure 10:
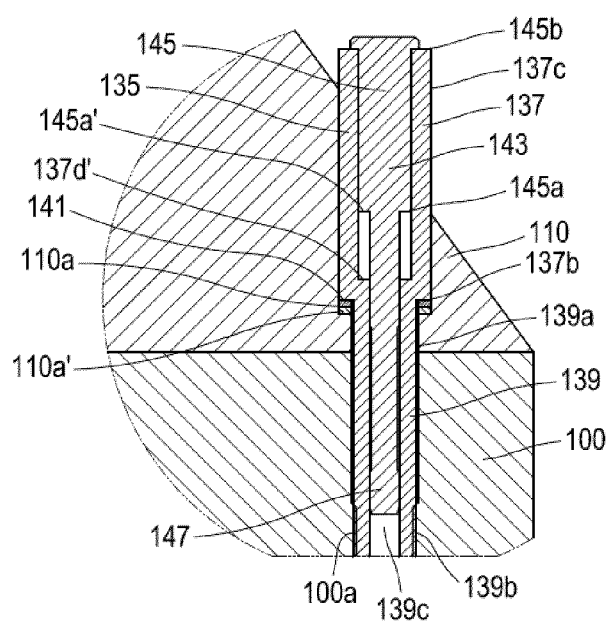
Figure 11:
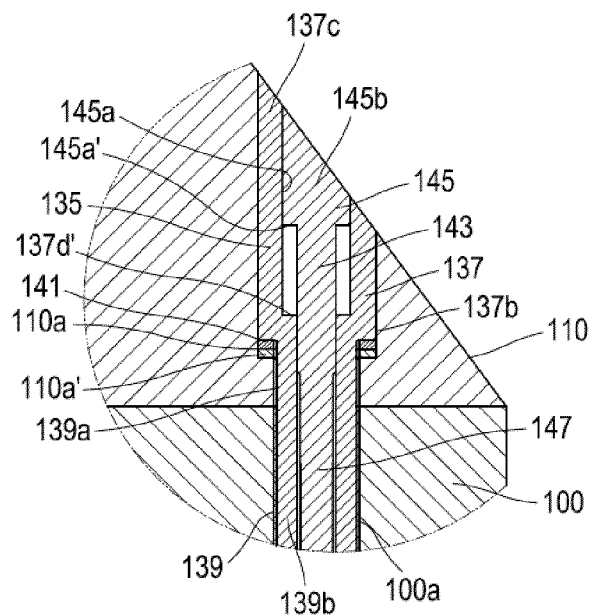
Figure 12:
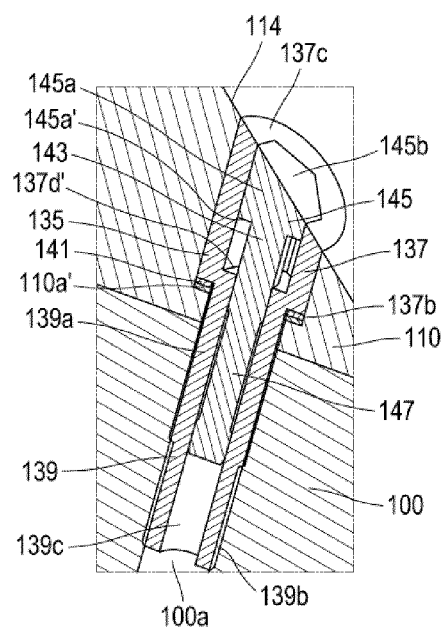
FIG. 12 shows a partial sectional view of the complete fastening system shown in FIGS. 9 to 11 after its installation.

Referring again to FIG. 3 and furthermore to FIG. 4, and also to FIGS. 7 and 8, the anti-wear device includes a plate 110 that is detachably attached to the rotor 100. A profile of the plate 110 is defined by a lower surface 112 and an upper surface 114 of the plate. The lower surface 112 has a curvature complementary to that of the tip 104a to facilitate direct fitting of the plate 110 to the blade 104 (and/or the blades in embodiments having two or more blades). In FIG. 8, it is shown that the junction between surfaces 112 and 104a can be circular, which facilitates the machining of the rotor 100 and the plate 110.

The upper surface 114 has a curvature complementary to that of the vessel wall in order to define, between them, an area of minimum distance that allows a passage of the mixture between the plate 110 and the vessel wall. In a plane perpendicular to the axis of rotation of the rotor 100, the profile of the plate 110 is defined by a predefined center of curvature of the plate and a predefined radius of curvature of the plate. In the embodiment shown, the profile of the plate 110 is defined by a radius of curvature that is increasingly progressive in a clockwise direction so that the plate profile resembles a spiral (i.e., the curve formed along the lower surface 112 rotates around a longitudinal axis).

The profile of the plate 110 is therefore complementary to the rotor geometry and the vessel geometry as understood by a skilled person. Referring to FIG. 3, the representative rotor 100 has a blade 104 machined with an anti-wear device attached. In some embodiments of the rotor 100, a second non-machined blade 104' can be integrated with both blades having identical profiles (see FIGS. 5 and 6). In other embodiments of the rotor 100, the representative rotor 100 has two blades 104 machined with an anti-wear device attached to a first blade. The second blade is machined to ensure the immediate attachment of an anti-wear device (not shown) so that both blades have identical profiles. It is understood that the rotor 100 can incorporate several blades depending on the selected mixer and/or the selected rubber mixture recipe. For the two representative rotors 100, and for rotors incorporating several blades, a rotor profile resembles the profile of a one-piece rotor.

Figure 5:
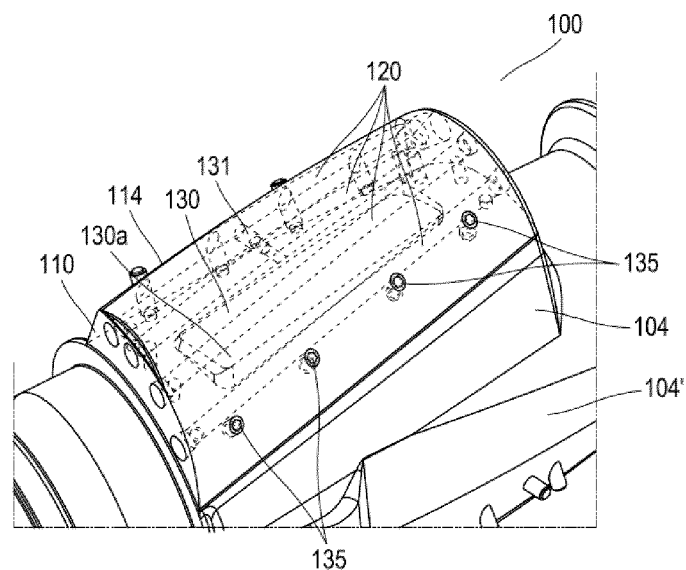
FIG. 5 represents a perspective view of another representative rotor with which the anti-wear device of FIG. 3 is used.
Figure 6:
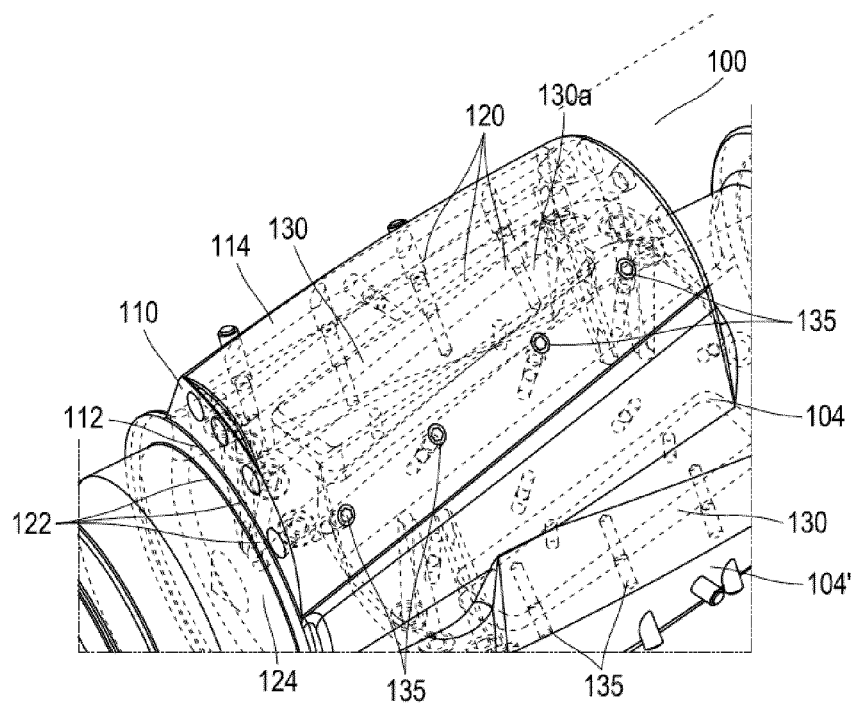
FIG. 6 represents a partial transparent view.

Referring again to FIGS. 3 and 4, and additionally to FIGS. 5 and 6, the plate 110 has cooling channels 120 that extend axially along a length of the plate 110. The cooling channels 120 are arranged along the profile of the plate 110 (see FIG. 6) and connect to supply conduits 122. The supply conduits 122 carry a corresponding coolant (such as water or other known coolant) to the plate 110 from a main conduit 124 of the rotor 100 (see FIG. 6). The cooling channels 120, the supply conduit 122 and the main conduit 124 together form a control circuit within the plate 110 to regulate the temperature of the mixture during a mixing cycle as understood by the person of ordinary skill. For the embodiment shown, the plate 110 has four cooling channels 120, but the number of cooling channels can be adapted as required.

In some embodiments, the invention also relates to sealing systems between the plate 110 and the rotor 100. With further reference to FIGS. 7 and 8, one embodiment of the invention includes a sealing means that is an O-ring 150 placed in a groove 152 to seal against a supply conduit 122. In this embodiment, the groove 152 is a trapezoidal groove so as not to lose the seal during assembly/disassembly of the anti-wear device. It is understood that the O-ring can be replaced by an equivalent seal or other equivalent sealing means. It is also understood that the groove can be formed with another useful geometry.

Referring again to FIGS. 3 to 8 and in addition to FIGS. 9 to 12, the plate 110 is detachably fixed to the tip 104a of the blade 104. In order to realize torque transmission, this fixation is realized by a mechanical fastening system having a positioning key (or "key") 130 and one or more screw fastening systems.

The key 130 is represented by a parallel key with a predetermined total length being fixed to the tip 104a by key screws 131 (see FIGS. 3 and 5). The key 130 engages in a corresponding groove (not shown) in the tip 104a so that an upper surface 130a of the key can engage a corresponding recess (not shown) in the lower surface 112 of the plate 110. It is understood that the fastening can be carried out by an equivalent key (e.g., a parallel key of type A, B or C or a disc key).

In order to detachably fix the plate 110 to the rotor 100, screw fastening systems are used to tighten the corresponding retaining screws. A screw fastening system (or "fastening system") 135 of the invention includes a retaining screw (or "screw") 137 having a substantially cylindrical elongated screw head 137a with a circumferential surface corresponding to the diameter of a counterbore 110a of the plate into which the retaining screw 137 is inserted. The screw head 137a extends along a predetermined length between an engagement end 137b, where an engagement surface 137b' is defined to engage a shoulder 110a' of the counterbore 110a of the plate (see FIG. 14), and an access end 137c, that allows access to the retaining screw to perform actions of installing, tightening and removing the retaining screw. An insertion channel 137d, which extends along the length of the screw head 137a, has a cross-sectional geometry corresponding to a geometry of a corresponding clamp of the fastening system (described below). The clamping means will be inserted into the insertion channel 137d to carry out the mounting of the retaining screw 137 with respect to the rotor 100.

The retaining screw 137 also includes a substantially cylindrical elongated screw shank 139 that extends from the engagement surface 137b' of the screw head 137a. The screw shank 139 has a thread of a predetermined diameter that is retained in a threaded bore of the corresponding rotor 100a in which the retaining screw 137 is mounted. The screw shank 139 extends along a predetermined length between an insertion end 139a, where the screw shank receives the clamping means passing to the insertion channel 137d of the screw head 137a, and an opposite end 139b fixed in the rotor 100. A mounting conduit 139c extends along the length of the screw shank 139 to receive the corresponding clamping means of the fastening system 135 (see FIGS. 10, 12 and 14).

Each counterbore 110a of the plate is aligned with a corresponding rotor thread 100a so that a corresponding retaining screw 137 can penetrate the counterbore of the plate aligned with the rotor thread where the retaining screw is positioned relative to the rotor 100. To carry out the positioning and tightening of the retaining screws 137 with respect to the rotor 100, each retaining screw 137 is inserted into a counterbore of the corresponding plate 110a (see FIG. 9). Each retaining screw 137 is tightened by a known means (e.g., with a torque wrench to a predefined preload torque) until the engagement surface 137b' of the screw head 137a engages against the shoulder 110a' of the counterbore of the plate 110.

In one embodiment of the fastening system 135, the fastening system additionally includes a cam locking washer 141. The cam locking washer 141 can be used with each retaining screw 137 to prevent loosening of the retaining screw with respect to the rotor 100. In this embodiment, the cam locking washer 141 is disposed between the engagement end of the screw head 137a and the shoulder 110a' of the counterbore 110a of the plate. For this embodiment, the cam locking washer 141 is fitted into the counterbore 110a of the plate before the retaining screw 137 is fitted. The cam locking washer 141 is available in commerce (e.g., among the types of cam locking washers supplied by Nord-Lock).

The fastening system 135 also includes a clamp that is supplied together with the retaining screw 137. The clamp includes a central pin (or "pin") 143 that acts as a plug. To achieve the assembly of the retaining screw 137 with respect to the rotor 100, the central pin 143 includes a plug 145 with a cross-sectional geometry corresponding to that of the insertion channel 137d of the screw head 137a into which the central pin is inserted. In the embodiment shown, this cross-sectional geometry is hexagonal for the plug 145 and for the insertion channel 137*d* (see FIG. 12). Of course, other geometries can also be used. The plug 145 extends along a predetermined length between an engagement end 145*a*, where an engagement surface 145*a'* of the plug is defined to engage against a shoulder 137*d'* of the insertion channel 137*d* of the screw head 137*a*, and an opposite outer end 145*b*.

The central pin 143 also includes an elongated substantially cylindrical shank 147 that extends from the engagement end 145*a* of the plug 145. The shank 147 has a predetermined diameter corresponding to the mounting conduit 139*c* of the screw body 139 in which the central pin 143 is mounted. The diameter of the shank 147 and the diameter of the mounting conduit 139*c* are defined so as to realize an interference fit, thereby preventing movement of the central pin 143 without significant external force.

In order to insert and tighten the fastening system 135, the central pin 143 is positioned in the insertion channel 137*d* of the screw head 137*a*. The plug 145 of the central pin 143 fits inside the retaining screw 137 and abuts against the shoulder 137*d'* of the insertion channel 137*d* (see FIG. 10 and also FIG. 12). Then the retaining screw 137 and the plug 145 are cut so that they are flush with the outer surface of the plate (e.g., the upper surface 114) (see FIGS. 11 and 12). This cutting may be done by known means, including, without limitation, grinding or other portable cutting means.

These operations are repeated for all fastening systems including the retaining screw 137 and the plug 145. After cutting, the retaining screws 137 and the plug 145 have a geometry that conforms to the outer shape of the upper surface 114 of the plate 110, avoiding any areas of retention of the mixture.

Figure 13:
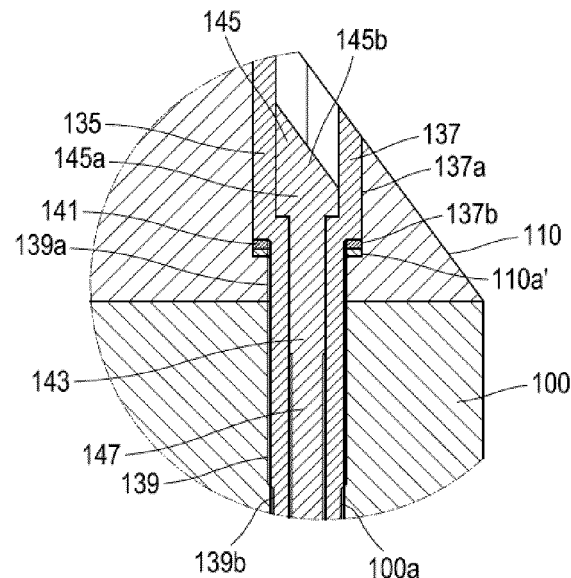
FIGS. 13 and 14 show the fastening system of FIGS. 9 to 11 during removal of the rotor.
Figure 14:
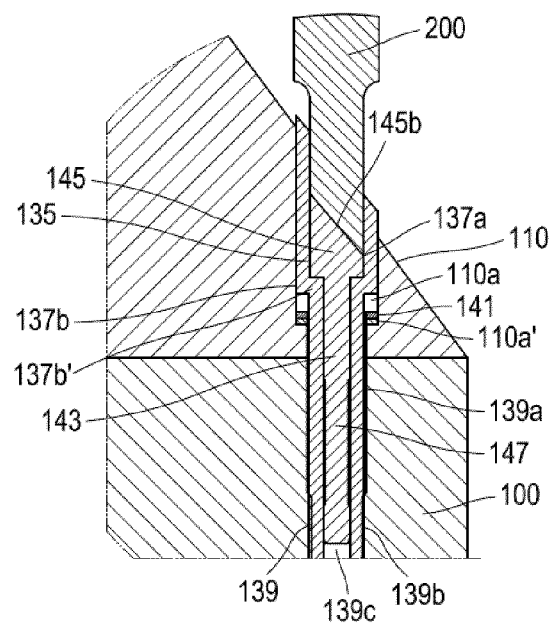

Referring again to FIGS. 3 to 12, and in addition to FIGS. 13 and 14, when the plate 110 must be changed, the fastening system 135 is removed using a hammer and a snap ring (not shown). Using the snap ring and hammer, the central pin 143 is pushed back to release the recess of the retaining screw 137 (e.g., the hexagonal recess shown in FIG. 12). A specific end cap (for example, hexagonal end cap 200 of FIG. 14) is inserted that corresponds to the recess in the outer end 145*b* of the plug 145. The end cap 200 is cut at the same angle as a surface of the outer end 145*b* of the plug 145. With a tool such as a ratchet wrench fitted to the end cap 200, the retaining screw 137 is loosened. These operations are repeated for all retaining screws 137 tightened in the plate 110.

The addition of an anti-wear device such as the plate 110 makes it possible to achieve the same geometry as a one-piece rotor. Thus, the effects of the micro-dispersion of additives (provided by the passage between the blade and the vessel wall) and the distribution of components (achieved by the mass transfer of material between the vessels along the rotor 100 in each vessel) are not compromised.

When the plate 110 is worn out (either with heads and plugs or without heads and plugs), an in-situ intervention is carried out to replace it. In addition, the fact that the worn parts of the rotors can be changed more easily, will allow more frequent changes and thus limit the gap variations between the vessel wall and the rotor. Downtime and associated costs are thus limited while rubber dispersion, rubber mixing performance and rubber mixture quality are preserved.

The problem of wear is solved simply with an anti-wear device that is easily machined and customized to the precise dimensions of the rotor. The disclosed plate can be applied to newly purchased rotors as well as to rotors already in use with a very short re-commissioning time. Replacement of the rotors that are needed to guarantee industrial production can be limited to replacement of the wear devices of the invention, without loss of production. Plates and rotors can be supplied in one or more kits including at least one additional plate with each rotor. The plates are therefore available as required to reduce the time and investment associated with the expected assembly/disassembly. In addition, the use of rotor plates does not change the operating parameters of the rotor.

The addition of certain coatings is not possible for rotors of the monobloc type or for other known rotor types with a size and weight that prevents the addition of coatings (e.g., in vacuum furnaces with limited dimensions). The disclosed invention makes it possible to apply coatings to the anti-wear device that include, for example, without limitation, physical vapour deposition (PVD) (e.g. chromium nitride), chemical vapour deposition (CVD) (e.g. titanium nitride) and their equivalents. Devices with already incorporated coatings can be added in kits to give users more choice.

The terms "at least one" and "one or more" are used interchangeably. Ranges that are presented as "between a and b" include both "a" and "b" values.

Although particular embodiments of making the invention have been illustrated and described, it is understood that various changes, additions and modifications may be made without deviating from the spirit and scope of this disclosure. Therefore, no limitations should be imposed on the scope of the invention described except those set forth in the claims annexed hereto.

The invention claimed is:

1. A rotor for use in an internal mixer having a mixing vessel in which the rotor rotates, the rotor comprising:
   one or more blades, each blade having a tip with a profile having a predefined curvature;
   an anti-wear device detachably fixed to the tip of at least one blade, the anti-wear device comprising a plate with a profile defined by a lower surface with a curvature complementary to that of the tip and an upper surface with a curvature complementary to that of a wall of the vessel to define, between them, a zone of minimum gap that allows a passage of a mixture between the plate and the wall of the vessel; and
   one or more fastening systems positioned and tightened relative to the plate in order to engage the rotor,
   wherein each fastening system comprises:
      a retaining screw comprising:
         an elongated substantially cylindrical screw head with a circumferential surface corresponding to a diameter of a counterbore of the plate into which the retaining screw is inserted, the screw head extending along a predetermined length between an engaging end, where an engagement surface is defined for engaging a shoulder of the counterbore of the plate, and an access end, the screw head with an insertion channel extending along the length of the screw head with a predetermined cross-sectional geometry; and
         a substantially cylindrical elongated screw shank extending from the engagement surface of the screw head, the screw shank with a predetermined diameter being held in a corresponding rotor thread in which the retaining screw is mounted, the screw shank extending along a predetermined length between an insertion end, where the screw shank receives a clamping means passing to the insertion channel of the screw head, and an opposite end fixed in the rotor, the screw shank with a mounting conduit extending along the length of the screw shank; and a clamping means comprising a central pin, the central pin comprising:

a plug with a cross-sectional geometry corresponding to the predetermined cross-sectional geometry of the insertion channel of the screw head, the plug extending along a predetermined length between an engaging end, where an engaging surface of the plug is defined to engage against a shoulder of the insertion channel of the screw head, and an opposite outer end; and a substantially cylindrical elongated rod extending from the engagement end of the plug, the rod having a predetermined diameter corresponding to the mounting conduit of the screw shank for mounting the central pin therein.

2. The rotor according to claim 1, wherein the profile of the plate is defined by a radius of curvature of the plate that is increasingly progressive in a clockwise direction so that the profile of the plate resembles a spiral.

3. The rotor according to claim 1, wherein the plate comprises one or more cooling channels that extend axially along a length of the plate, the cooling channels being arranged along the profile of the plate and connecting to supply conduits that convey a corresponding coolant to the plate from a main conduit of the rotor.

4. The rotor according to claim 3, further comprising a sealing means for providing a seal between the rotor and the plate.

5. The rotor according to claim 4, wherein the sealing means comprises an O-ring that is placed in a corresponding groove.

6. The rotor according to claim 5, wherein the groove is a trapezoidal groove.

7. The rotor according to claim 1, wherein each counterbore of the plate is aligned with a corresponding rotor thread so that a corresponding retaining screw can penetrate the counterbore aligned with the rotor thread where the retaining screw is fitted with respect to the rotor.

8. The rotor according to claim 1, wherein the fastening system further comprises a cam locking washer, the cam locking washer being disposed between the engagement end of the screw head and the shoulder of the counterbore of the plate.

9. The rotor according to claim 1, further comprising a mechanical fastening system.

10. The rotor according to claim 9, wherein the mechanical fastening system comprises a positioning key.

11. The rotor according to claim 10, wherein the positioning key comprises a parallel key with a top surface that engages a corresponding reinforcement of the lower surface of the plate, the positioning key engaging a corresponding top groove.

12. The rotor according to claim 1, wherein the rotor comprises two blades and the blades are inclined in mutually opposite directions.

13. An internal mixer having at least one mixing vessel in which a rotor according to claim 1 rotates.

* * * * *